United States Patent [19]
Moriconi

[11] 3,967,548
[45] July 6, 1976

[54] WASTE COMPACTOR

[75] Inventor: Dario J. Moriconi, Bloomfield Hills, Mich.

[73] Assignee: McClain Industries Inc., Utica, Mich.

[22] Filed: Aug. 25, 1975

[21] Appl. No.: 607,132

Related U.S. Application Data

[63] Continuation of Ser. No. 422,422, Dec. 6, 1973, abandoned.

[52] U.S. Cl. .......................... 100/229 A; 100/255; 280/79.2
[51] Int. Cl.² ........................................ B30B 15/32
[58] Field of Search............ 100/229 A, 229 R, 255; 220/4 B, 4 E; 232/43.1; 280/79.1, 79.2

[56] References Cited
UNITED STATES PATENTS

| | | | |
|---|---|---|---|
| 2,757,603 | 8/1956 | Wilson et al. | 100/229 A |
| 2,970,533 | 2/1961 | Allen | 100/255 X |
| 3,463,079 | 8/1969 | Corbett | 100/229 A |
| 3,613,566 | 10/1971 | Shapleigh et al. | 100/229 A |
| 3,807,299 | 4/1974 | Engebretsen | 100/229 A |
| 3,808,967 | 5/1974 | Fair et al. | 100/229 A |
| 3,831,513 | 8/1974 | Tashman | 100/229 A |

Primary Examiner—Billy J. Wilhite
Attorney, Agent, or Firm—Barnes, Kisselle, Raisch & Choate

[57] ABSTRACT

A waste compactor comprising a frame, a compactor member movable on the frame into and out of a cart associated with the frame. The cart is removable from the frame and comprises two sections pivoted to one another about a generally horizontal axis. When in one position, the sections define a bottom wall, side walls, and end walls having an open end for receiving a disposable waste container. The cart is removable from the frame so that one of the sections may be pivoted about the horizontal axis upwardly to move one of the end walls out of position in order that the disposable container can be removed by horizontal movement.

7 Claims, 7 Drawing Figures

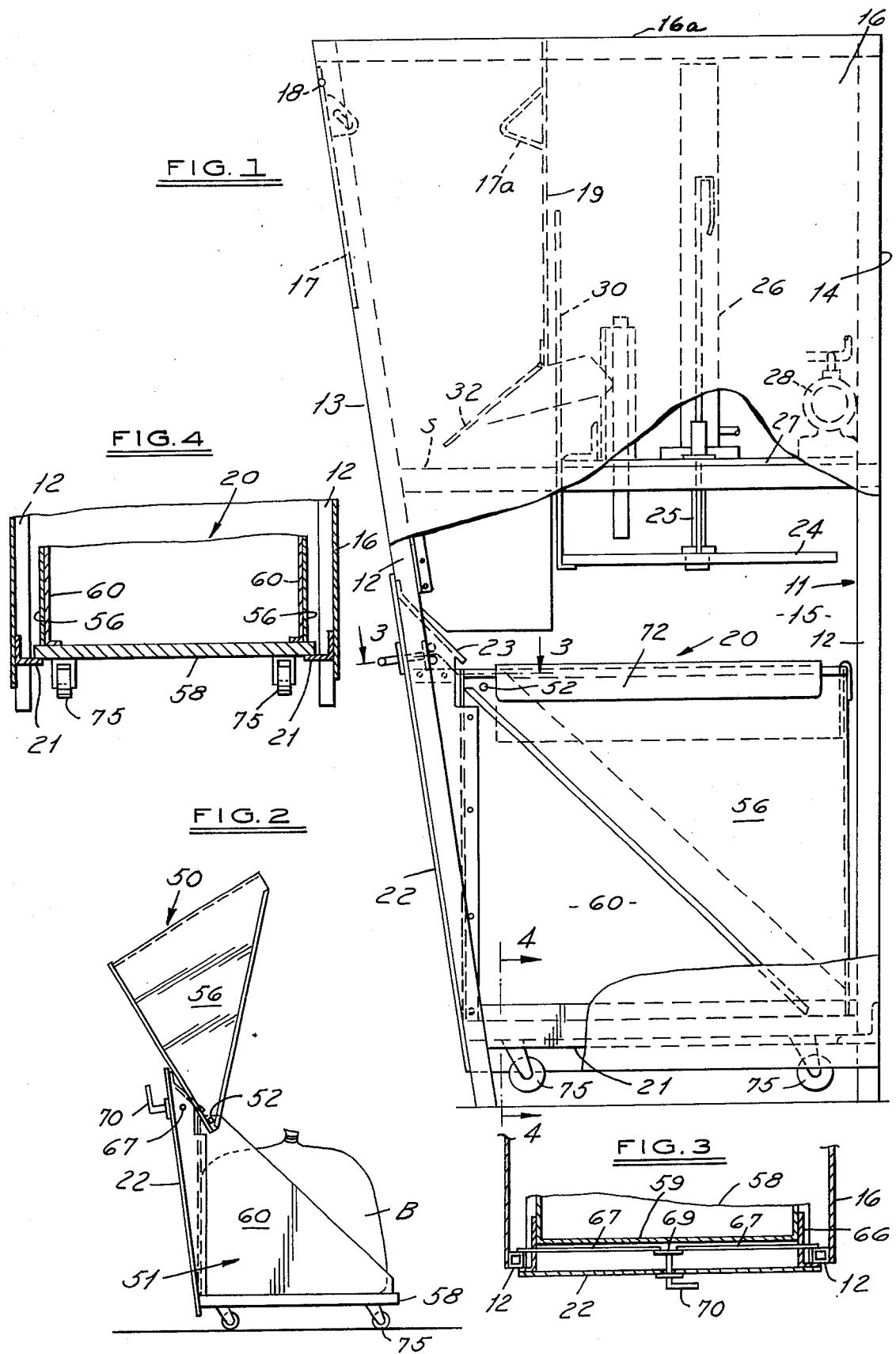

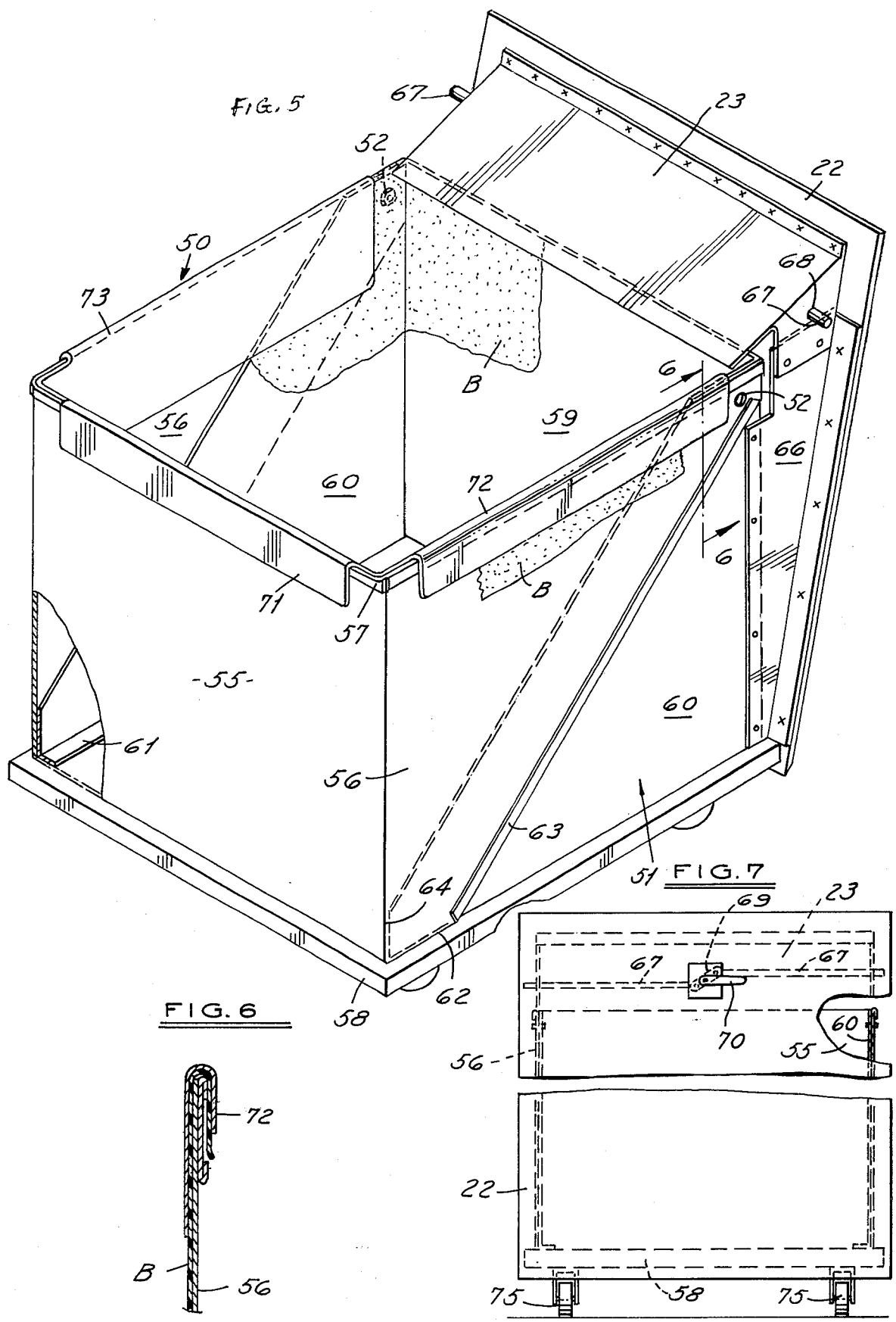

WASTE COMPACTOR

This is a continuation of application Ser. No. 422,422, filed Dec. 6, 1973 now abandoned.

This invention relates to waste compactors.

BACKGROUND OF THE INVENTION

In waste disposal, it has become common in commercial applications to utilize waste compactors in order to conserve costs of transportation and handling of waste. It has also heretofore been suggested that smaller waste compactors be utilized in commercial installations such as business establishments, restaurants, kitchens and the like. Such compactors customarily utilize a control that must be manually operated or initiated and, as a result, have not achieved any substantial success in use in installations where the customer disposes of the waste such as in quick food service establishments.

In my copending United States patent application Ser. No. 409,248, filed Oct. 24, 1973, now U.S. Pat. No. 3,901,139 there is disclosed and claimed a waste compactor which is automatically operable and does not require initiation manually by an operator; which is responsive to the extent of usage; and which is relatively simple and low in cost as well as being safe and easily maintained.

Among the objects of the present invention are to provide a removable cart which can be used with the waste compactor such as disclosed in the aforementioned application or with respect to other compactors having vertically movable compactor members; which effectively holds a disposable container for accumulating the waste; which can be easily removed; which provides a construction such that the disposable container can be removed from the cart without lifting; which cart is strong, sturdy and will withstand normal usage with minimum maintenance.

SUMMARY OF THE INVENTION

In accordance with the invention, a cart is associated with a waste compactor comprising a frame and a compactor member movable into and out of the cart. The cart comprises two sections pivoted to one another about a generally horizontal axis. When in one position, the sections define a bottom wall, side walls, and end walls having an open end for receiving a disposable waste container. The cart is removable from the frame so that one of the sections may be pivoted about the horizontal axis upwardly to move one of the end walls out of position in order that the disposable container can be removed by horizontal movement.

DESCRIPTION OF THE DRAWINGS

FIG. 1 is a part sectional elevational view of a waste compactor embodying the invention.

FIG. 2 is a side elevational view of a cart utilized in the compactor shown in FIG. 1 showing the parts in position for removal of a filled disposable container.

FIG. 3 is a fragmentary sectional view taken along the line 3—3 in FIG. 1.

FIG. 4 is a fragmentary sectional view taken along the line 4—4 in FIG. 1.

FIG. 5 is a perspective view of the cart utilized in the waste compactor shown in FIG. 1.

FIG. 6 is a fragmentary sectional view taken along the line 6—6 in FIG. 5.

FIG. 7 is a part sectional front elevational view of the cart shown in FIG. 5.

DESCRIPTION

Referring to FIG. 1, the waste compactor 10 embodying the invention comprises a frame 11 comprising four tubular members 12 with lower ends engaging the floor and panels 13, 14, 15, 16, and a top panel 16a enclosing the frame to form the housing.

An access door 17 is pivoted about a horizontal axis 18 adjacent its upper end and swings inwardly, as presently described, to permit depositing of waste. A stop 17a limits the inward movement of door 17. A vertical wall 19 is spaced inwardly from the panel 13 and guides the waste downwardly to a cart or container 20 that is supported on rails 21 within the frame. The cart 20 is adapted to support a disposable container such as a plastic bag B for receiving the waste. The front panel 22 of the cart 20 is in the plane of panel 13 and closes the front of the compactor when the cart is in position. A deflector 23 on the cart 20 extends downwardly and inwardly to help deflect the waste into the bag, as presently described.

A flat compactor plate 24 is mounted on a shaft 25 of a hydraulic cylinder or ram 26 and is movable downwardly to compact the waste within the bag. Hydraulic ram or cylinder 26 is mounted on an intermediate wall 27 extending horizontally between frame members 12. The wall 27 supports a pump 28 and associated electric motor for driving the pump for supplying hydraulic fluid to the ram or cylinder 26. As the compactor plate 24 moves downwardly, a vertical shield 30 on the compactor plate 24 extends downwardly to prevent waste from falling above the compactor plate 24.

As more fully described in the aforementioned patent application Ser. No. 409,248, now U.S. Pat. No. 3,901,139 in order to insure that the energization of the compactor and actuation of the compactor plate 24 will occur only when there is a need, a mercury switch is mounted on the access door 17 and functions to complete a circuit to a time delay. When the door 17 is held open for a predetermined interval of time, the hydraulic pump 28 is actuated causing the cylinder 26 to drive the compactor plate 24 downwardly. More specifically, each time the door is opened, the time interval is registered and when the total time accumulated from successive openings exceeds a predetermined time, the operation of the compactor member is initiated.

Also, as described in the aforementioned patent application, in order to provide safety in the event that the person depositing waste has inserted his hand deeply into the guideway formed by the inner surface of panel 13 and the vertical wall 19, a flat safety shield 32 is pivoted adjacent its upper end as at 33. Safety shield 32 normally extends vertically out of the path of the trash and is operable upon downward movement of the compactor plate 24 to swing to the position shown in FIG. 1 thereby tending to move the hand, if present, out of the way and insuring that the hand will not be in the patch of the compactor plate 24. The length of the shield 32 is such that when in the obstructing position, as shown in FIG. 1, a space S is provided between the lower edge of the shield 32 and the inner surface of panel 13. This permits room for the arm of the operator in case the arm is engaged by the edge of the shield 32. In addition, any liquids in trash deposited when the shield 32 is in this position can pass freely down to deflector 23 and into the cart.

Referring to FIGS. 5–7, the cart 20 comprises two sections 50, 51 pivoted to one another by bolts 52 about a substantially horizontal axis. Sections 50, 51 cooperate when in the position shown in FIG. 5 to define a space having an open upper end for delivering waste into plastic bag B.

Section 50 comprises a front wall 55 and substantially triangular side wall portions 56. The upper edge of the end wall 55 and side wall portions 56 is turned over as at 57 to provide a flange for strengthening the section 50.

The other section 51 comprises a bottom wall 58, an end wall 59, and side wall portions 60 that are substantially triangular in shape. The lower edges of the end wall 59 and side wall portions 60 include a flange 61 that engages the upper surface of the bottom wall 58 and then serves as a means for connecting the section 51 thereto as by riveting.

The side walls 56 of section 50 include a portion 62 that engages the bottom wall 58 and has a flange 63 along the inclined free edge of section 56. Similarly, the side wall portions 60 of section 51 include portion 64 that engages the inner surface of the end wall 55.

The cart 20 further includes the aforementioned front wall 22 inclined upwardly and forwardly and connected to the portion 60 by intermediate walls 66. Deflector 23 extends downwardly as shown in FIGS. 1 and 5 to guide the waste into the cart 20.

Cart 20 is locked in position by manually operated rods or bolts 67 extending horizontally through openings 68 in intermediate walls 66 and actuated by a lever 69 controlled by a handle 70. When the bolts 67 are extended, they move behind the portions 12 of the frame 11.

A hold-down device comprising a member having three U-shaped interconnected sections 71, 72, 73 slips over the bag when it is folded over the upper edges of the sections 50, 51.

The bottom wall is provided with wheels 75 that are adapted to roll along the floor but are held above the floor when the cart engages the flanges 21.

After operation of the compactor member and filling of the bag, the handle 70 is manipulated to unlock the cart 20 and the cart 20 is pulled out of the frame 11 permitting the section 50 to be pivoted to the position shown in FIG. 2 so that the bag B can then be removed by horizontal movement without vertical lifting relative to the cart.

I claim:

1. In a waste compactor, the combination comprising a frame,
a cart associated with said frame,
a compactor member mounted on said frame for movement toward and away from said cart,
said cart being removable from said frame,
said cart comprising two sections,
said sections when in one position defining a bottom wall, side walls, and end walls having an open end for receiving a disposable waste container,
one of said sections comprising an end wall and side wall portions,
and the other of said sections comprising said bottom wall, the other end wall fixed to said bottom wall, and side wall portions fixed to said bottom wall,
said other end wall cooperating with said frame to form the front of said compactor,
said sections being pivoted to one another about a horizontal axis adjacent the upper end of said other end wall of said other section,
said cart being removable from said frame such that said one section may be pivoted about said horizontal axis upwardly to move its said end wall out of position whereby the disposable container can be removed by horizontal movement off of said bottom wall.

2. The combination set forth in claim 1 wherein said side wall portions of said sections comprise generally triangular portions.

3. The combination set forth in claim 2 wherein said triangular portions overlap one another when said sections are in position for retaining said disposable container.

4. The combination set forth in claim 3 wherein said side wall portions of said one section engage the bottom wall of said other section.

5. The combination set forth in claim 4 wherein said side wall portions of said other section engage the inner surface of the end wall of said one section.

6. The combination set forth in claim 1 including an inclined deflector associated with the upper edge of said other wall for deflecting waste into said disposable container and an inclined front wall extending from said cart in spaced relation to said other end wall which is fixed to said bottom wall and cooperating with said frame to define the front wall of said compactor.

7. The combination set forth in claim 6 including intermediate walls extending between said front wall and said side walls.

* * * * *